United States Patent
Bondarenko et al.

(10) Patent No.: US 12,412,081 B2
(45) Date of Patent: Sep. 9, 2025

(54) METHOD FOR PERMUTING DIMENSIONS OF A MULTI-DIMENSIONAL TENSOR

(71) Applicant: Arm Limited, Cambridge (GB)

(72) Inventors: Anton Bondarenko, Lund (SE); Anil Kumar Metla, Lund (SE); Robert David Hughes, Cambridge (GB); Joshua Mark Jian Li Slater, Cambridge (GB)

(73) Assignee: Arm Limited, Cambridge (GB)

( * ) Notice: Subject to any disclaimer, the term of this patent is extended or adjusted under 35 U.S.C. 154(b) by 1088 days.

(21) Appl. No.: 17/080,302

(22) Filed: Oct. 26, 2020

(65) Prior Publication Data

US 2022/0129744 A1     Apr. 28, 2022

(51) Int. Cl.
| | |
|---|---|
| *G06F 15/80* | (2006.01) |
| *G06F 7/76* | (2006.01) |
| *G06N 3/063* | (2023.01) |
| *G06N 3/08* | (2023.01) |

(52) U.S. Cl.
CPC ............ *G06N 3/08* (2013.01); *G06F 7/76* (2013.01); *G06F 15/8092* (2013.01); *G06N 3/063* (2013.01)

(58) Field of Classification Search
CPC .. G06N 3/08; G06N 3/063; G06F 7/76; G06F 15/8092
See application file for complete search history.

(56) References Cited

U.S. PATENT DOCUMENTS

| | | | | |
|---|---|---|---|---|
| 2017/0323224 | A1* | 11/2017 | Bruestle | G06F 9/46 |
| 2019/0042241 | A1* | 2/2019 | Akin | G06F 9/30134 |
| 2019/0391796 | A1* | 12/2019 | Brady | G06F 8/458 |
| 2020/0202198 | A1* | 6/2020 | Lee | G06N 3/08 |
| 2020/0409664 | A1 | 12/2020 | Li et al. | |

FOREIGN PATENT DOCUMENTS

| | | | | |
|---|---|---|---|---|
| EP | 3387549 A1 | * | 10/2018 | G06F 5/01 |
| JP | 2020024524 A | | 2/2020 | |
| WO | 2016007069 A1 | | 1/2016 | |

OTHER PUBLICATIONS

Combined Examination and Search Report dated Nov. 2, 2023 for GB Application No. GB2305884.5.

* cited by examiner

*Primary Examiner* — Charles Rones
*Assistant Examiner* — Ken Hoang
(74) *Attorney, Agent, or Firm* — EIP US LLP

(57) ABSTRACT

A method performed by a processor for permuting dimensions of a multi-dimensional tensor is described. The multi-dimensional tensor contains an array of tensor values in three or more dimensions that are stored in a first storage unit. The array of tensor values is transferred from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor. The dimensions of the multi-dimensional tensor may be further permuted by a programmable engine within the processor.

9 Claims, 13 Drawing Sheets

| Permutation | Operation Sequence |
|---|---|
| 0132 | 1. Data in NHWC in DRAM<br>2. Load pretending it is NCHW → 0231<br>3. NWCH, PLE swap HW (which is actually WC) → 0321<br>4. NCWH, Save NCHW (which will actually save as NHCW)<br>5. Next layer interprets as NHWC->0132 |
| 0213 | 1. Data in NHWC in DRAM<br>2. Load NHWC ->0123<br>3. NHWC, PLE swap HW ->0213<br>4. NWHC, Save NHWC (which will actually save as NWHC)<br>5. Next layer interprets as NHWC |
| 0231 | 1. Data in NHWC in DRAM<br>2. Load pretending it is NCHW->0231<br>3. NWCH, Save NHWC (which will actually save as NWCH)<br>4. Next layer interprets as NHWC->0231 |
| 0312 | 1. Data in NHWC in DRAM<br>2. Load NHWC<br>3. NHWC, Save NCHW->0312<br>4. Next layer interprets as NHWC->0312 |
| 0321 | 1. Data in NHWC in DRAM<br>2. Load pretending it is NCHW->0231<br>3. NWCH, PLE swap HW (which is actually WC)->0321<br>4. NCWH, Save NHWC (which will actually save as NCWH)<br>5. Next layer interprets as NHWC->0321 |

Fig. 5

Implementation of 0231

NHWC 1x8x3x4        0123

WXC = 3X4

| A | B | C | D | A | B | C | D | A | B | C | D |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 6a                                    H=8

NHWC 1x3x4x8        0231

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |

WXC = 4X8                                  H=3

Fig. 6b

Implementation of 0213

NHWC 1x8x3x4            0123

WXC = 3X4

| A | B | C | D | A | B | C | D | A | B | C | D |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 7a            H=8

NHWC 1x3x8x4            0213

W X C = 8 X 4

| A | B | C | D | A | B | C | D | A | B | C | D | A | B | C | D |
|---|---|---|---|---|---|---|---|---|---|---|---|---|---|---|---|
| A | B | C | D | A | B | C | D | A | B | C | D | A | B | C | D |
| A | B | C | D | A | B | C | D | A | B | C | D | A | B | C | D |

| A | B | C | D | A | B | C | D | A | B | C | D | A | B | C | D |
|---|---|---|---|---|---|---|---|---|---|---|---|---|---|---|---|
| A | B | C | D | A | B | C | D | A | B | C | D | A | B | C | D |
| A | B | C | D | A | B | C | D | A | B | C | D | A | B | C | D |

Implementation of 0321

NHWC 1x8x3x4                0123

WXC = 3X4

| A | B | C | D | A | B | C | D | A | B | C | D |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 8a                                    H=8

NHWC 1x3x4x8               0231

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |

WXC = 4X8                                 H=3

Fig. 8b

Implementation of 0312

NHWC 1x8x3x4      0123

WXC = 3X4

| A | B | C | D | A | B | C | D | A | B | C | D |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 9a      H=8

NHWC 1x4x8x3      0312

| A | B | C | A | B | C | A | B | C | A | B | C |
|---|---|---|---|---|---|---|---|---|---|---|---|
| A | B | C | A | B | C | A | B | C | A | B | C |
| A | B | C | A | B | C | A | B | C | A | B | C |
| A | B | C | A | B | C | A | B | C | A | B | C |

| A | B | C | A | B | C | A | B | C | A | B | C |
|---|---|---|---|---|---|---|---|---|---|---|---|
| A | B | C | A | B | C | A | B | C | A | B | C |
| A | B | C | A | B | C | A | B | C | A | B | C |
| A | B | C | A | B | C | A | B | C | A | B | C |

WXC = 4X3      H=4

Fig. 9b

Implementation of 0132

NHWC 1x8x3x4     0123

WXC = 3X4

| A | B | C | D | A | B | C | D | A | B | C | D |
|---|---|---|---|---|---|---|---|---|---|---|---|
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |
| A | B | C | D | A | B | C | D | A | B | C | D |

Fig. 10a                                   H=8

NHWC 1x3x4x8     0231

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |

WXC = 4X8                                  H=3

Fig. 10b

NHWC 1x4X3x8                                                    0321

| A | B | C | D | E | F | G | H | A | B | C | D | E | F | G | H |
|---|---|---|---|---|---|---|---|---|---|---|---|---|---|---|---|
| A | B | C | D | E | F | G | H | A | B | C | D | E | F | G | H |
| A | B | C | D | E | F | G | H | A | B | C | D | E | F | G | H |
| A | B | C | D | E | F | G | H | A | B | C | D | E | F | G | H |

| A | B | C | D | E | F | G | H |
|---|---|---|---|---|---|---|---|
| A | B | C | D | E | F | G | H |
| A | B | C | D | E | F | G | H |
| A | B | C | D | E | F | G | H |

WXC = 3X8                    H=4

Fig. 10c

NHWC 1x8x4x3                                                    0132

| A | B | C | A | B | C | A | B | C | A | B | C |
|---|---|---|---|---|---|---|---|---|---|---|---|
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |
| A | B | C | A | B | C | A | B | C | A | B | C |

WXC = 4X3                           H=8

Fig. 10d

METHOD FOR PERMUTING DIMENSIONS OF A MULTI-DIMENSIONAL TENSOR

BACKGROUND OF THE INVENTION

Field of the Invention

The present invention relates to a method for permuting dimensions of a multi-dimensional tensor.

Description of the Related Technology

Neural processing units (NPU) are specialized processors for processing neural networks. Such chips are designed to efficiently perform operations commonly required by neural networks, such as multiply-accumulate operations. Similarly, Graphics Processing Units (GPU) are specialized processors for performing graphics operations, such as matrix and vector operations relating to translation of coordinate systems.

Specialized processors, such as neural processing units and graphics processing units, may have hardware design features that allow certain types of operations to be performed efficiently and in parallel, but may also have limitations that make it more difficult to perform other operations.

For example, some neural networks require permutation of the axes of the output feature map as an operation during processing of the neural network. Examples of such neural networks might be super-resolution neural networks for obtaining higher resolution images from lower resolution images. A further situation where permuting dimensions may be required is during the training of a neural network.

In other situations, permuting the dimensions of a data set may be a pre-processing step for efficient matrix multiplication algorithms because the permutation may provide improved cache access patterns.

Unfortunately, some specialized processor hardware designs make performing operations for permuting dimensions of a multi-dimensional tensor difficult to perform efficiently.

SUMMARY

According to a first aspect there is provided a method performed by a processor for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

According to a second aspect there is provided a processor for permuting dimensions of a multi-dimensional tensor, wherein the multi-dimensional tensor contains an array of tensor values in three or more dimensions that are stored in a first storage unit, the processor comprising: a controller configured to control transfer of the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

According to a third aspect there is provided a non-transitory computer-readable storage medium storing instructions that, when performed by a processor, cause the processor to perform a method for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

BRIEF DESCRIPTION OF THE DRAWINGS

Embodiments will now be described with reference to the accompanying drawings in which:

FIG. 5 is a table showing operation sequences for permuting dimensions of a tensor;

FIGS. 6a and 6b illustrate tensors in a 0231 permutation;

FIGS. 7a and 7b illustrate tensors in a 0213 permutation;

FIGS. 8a to 8c illustrate tensors in a 0321 permutation;

FIGS. 9a and 9b illustrate tensors in a 0312 permutation; and

FIGS. 10a to 10d illustrate tensors in a 0132 permutation.

DETAILED DESCRIPTION OF CERTAIN INVENTIVE EMBODIMENTS

Figure 1:
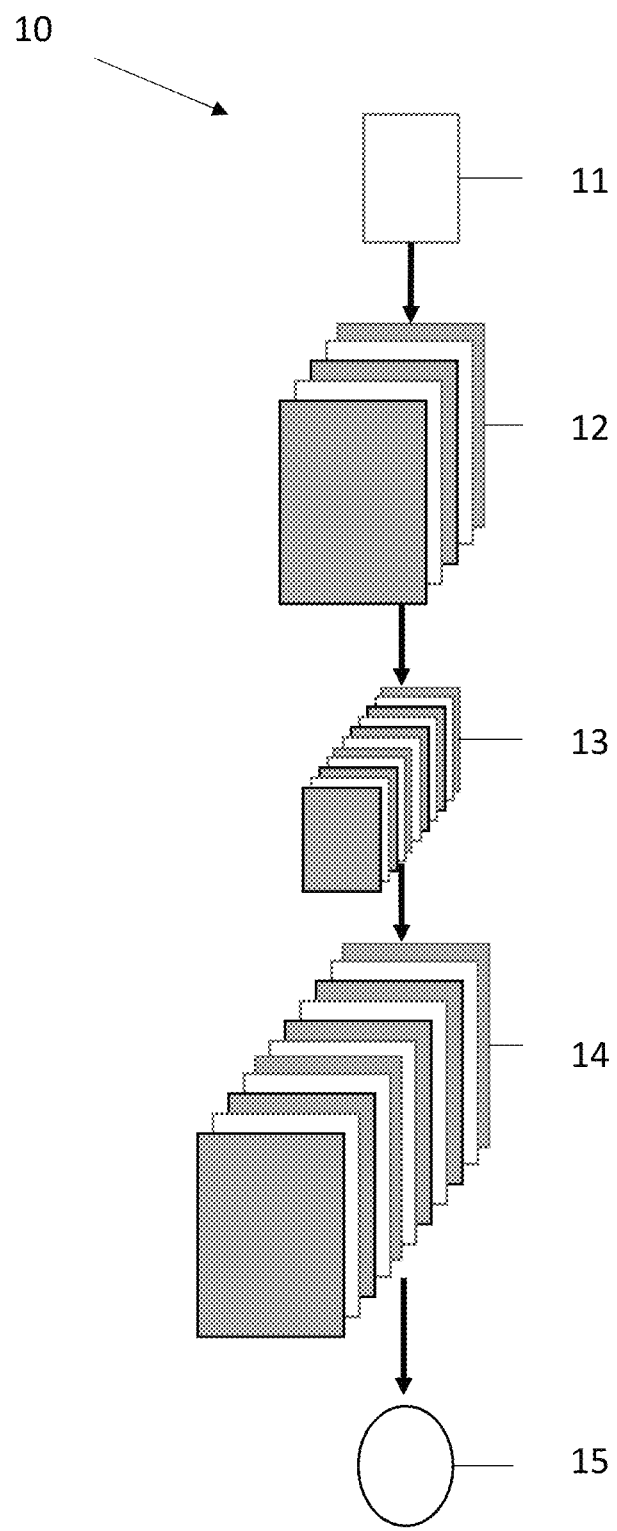
FIG. 1 is a diagram showing steps of processing a neural network.

Before discussing particular embodiments with reference to the accompanying figures, the following description of embodiments is provided.

A first embodiment provides a method performed by a processor for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

Throughout this specification the term permute is used to refer to an operation that changes the order of at least two dimensions of a tensor. The term 'permute' is to be understood to include the term 'transpose', which may be used elsewhere in the art for the same or similar operation.

The first dimension of the multi-dimensional tensor is different from the second dimension of the multi-dimensional tensor. The process of transferring the array of tensor values arrayed along a first dimension of the multi-dimensional tensor and writing corresponding values to the second storage in locations corresponding to a second dimension of the multi-dimensional tensor has the effect of reordering the tensor values. The locations in the second storage corresponding to a second dimension of the multi-dimensional tensor are locations in the second storage that correspond to a second dimension of the multi-dimensional tensor in a data format by which a process will subsequently read the multi-dimensional tensor from the second storage.

In other words, the first dimension of the multi-dimensional tensor may be a first dimension of the multi-dimensional tensor in a first data format in which the multi-dimensional tensor is stored in the first storage. The second dimension is a second dimension of the multi-dimensional tensor in a second data format in which the tensor is stored in the second storage. The first and second data format may be the same data format or a different data format.

The first storage unit may be one of an external storage unit in communication the processor and a local storage unit of the processor. The second storage unit may be the other of the external storage unit in communication with the processor and the local storage unit of the processor.

The processor may be at least one of a neural processing unit, a graphics processing unit, and a central processing unit.

The multi-dimensional tensor may be an output feature map of a neural network.

The processor may comprise one or more programmable engines. The method may further comprise the one or more programmable engines permuting a pair of dimensions of the multi-dimensional tensor.

The one or more programmable engines may have a maximum number of tensor values that it can operate on in a cycle. The method may comprise the one or more programmable engines sequentially: reading sub-blocks of the multi-dimensional tensor from a local storage, permuting the pair of dimensions of the sub-block of the multi-dimensional tensor and writing the permuted sub-blocks to the local storage of the processor, wherein the sub-blocks are read from and written to the local storage using addresses in the local storage so as to re-order the sub-blocks to complete the permutation of the pair of dimensions across the multi-dimensional tensor, wherein the local storage is one of the first storage unit and the second storage unit.

The one or more programmable engines may be a plurality of programmable engines, wherein the method comprises two or more of the programmable engines permuting the pair of dimensions of the multi-dimensional tensor in parallel.

The tensor values may be read from the first storage and written to the second storage in stripes of data.

The method may comprise transferring the array of tensor values from the second storage unit to the first storage unit. Transferring the stripe of tensor values from the first storage unit to the second storage unit may occur in parallel with transferring another stripe of tensor values from the second storage unit to the first storage unit.

The method may further comprise one or more programmable engines permuting a pair of dimensions of a further stripe of the multi-dimensional tensor in parallel with at least one of transferring the stripe of tensor values from the first storage unit to the second storage unit and transferring another stripe of tensor values from the second storage unit to the first storage unit.

The first storage may be an external storage in communication with the processor and the second storage may be a local storage of the processor. The method may further comprise the one or more programmable engines permuting a pair of dimensions of the multi-dimensional tensor stored in the second memory. The method may further comprise transferring the array of tensor values that have been permuted by the one or more programmable engines from the second storage unit to the first storage unit by reading tensor values from the second storage that are arrayed along a dimension of the multi-dimensional tensor and writing the corresponding tensor values to the second storage in locations corresponding to a different dimension of the multi-dimensional tensor. Such a method may have the effect of permuting a tensor with a set of dimensions 0123 originally stored in the first storage to a tensor with dimensions 0132 in the first storage.

The first storage may be an external storage in communication with the processor and the second storage may be a local storage of the processor. The method may further comprise transferring the array of tensor values from the second storage unit to the first storage unit without further permuting the dimensions of the tensor. Such a method may have the effect of permuting a set of dimensions 0123 of the tensor originally stored in the first storage to a tensor with dimensions 0231 in the first storage.

The first storage may be a local storage of the processor and the second storage may be an external storage in communication with the processor. The method may further comprise transferring the array of tensor values from the second storage unit to the first storage unit without permuting the dimensions of the tensor before transferring the tensor values from the first storage unit to the second storage unit. Such a method may have the effect of permuting a tensor with a set of dimensions 0123 originally stored in the second storage to a tensor with dimensions 0312 in the second storage.

The first storage may be an external storage in communication with the processor and the second storage may be a local storage of the processor. The method may further comprise the one or more programmable engines permuting a pair of dimensions of the multi-dimensional tensor stored in the second memory. The method may further comprise transferring the array of tensor values that have been permuted by the one or more programmable engines from the second storage unit to the first storage unit without further permuting the dimensions of the tensor. Such a method may have the effect of permuting a tensor with a set of dimensions 0123 originally stored in the first storage to a tensor with dimensions 0321 in the first storage.

A second embodiment may provide a processor for permuting dimensions of a multi-dimensional tensor, wherein the multi-dimensional tensor contains an array of tensor values in three or more dimensions that are stored in a first storage unit, the processor comprising: a controller configured to control transfer of the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

A third embodiment may provide a non-transitory computer-readable storage medium storing instructions that, when performed by a processor, cause the processor to perform a method for permuting dimensions of a multi-dimensional tensor, wherein the multi-dimensional tensor contains an array of tensor values in three or more dimensions that are stored in a first storage unit, the method comprising: transferring the array of tensor values from the first storage unit to a second storage unit by reading tensor values from the first storage that are arrayed along a first dimension of the multi-dimensional tensor and writing the corresponding tensor values to the second storage in locations corresponding to a second dimension of the multi-dimensional tensor.

A further embodiment provides a method performed by a processor comprising one or more programmable engines, the method comprising the one or more programmable engines permuting a pair of dimensions of a multi-dimensional tensor stored in a local storage of the processor.

The processor may be a neural processing unit. The one or more programmable engines may be one or more programmable layer engine of the neural processing unit.

A further embodiment provides a processor comprising one or more programmable engines, wherein the one or more programmable engines is configured to permute a pair of dimensions of a multi-dimensional tensor stored in a local storage of the processor.

A further embodiment provides a non-transitory computer-readable storage medium storing instructions that when executed cause a processor having one or more programmable engines to perform a method comprising permuting a pair of dimensions of a multi-dimensional tensor stored in a local storage of the processor.

Particular embodiments will now be described, with reference to the figures.

FIG. 1 is a schematic diagram showing stages of processing of a neural network 10. An input tensor is received at input layer 11, and is processed through multiple hidden layers 12, 13 and 14. Each layer is made up of a given number of nodes—this number of nodes is referred to as the size of the layer in question. At each layer, filters are applied to values in the preceding layer to generate, for convolution layers, one or more feature maps. These filters may consist of a variety of operations, including but not limited to convolutional operations and pooling operation. Depending on the filter applied, each layer will have different processing requirements. Once all the layers 12, 13 and 14 have been passed through, an output 15 is generated.

In the first layer 11, a first set of filters are applied to the input tensor to generate one or more output feature maps. At each subsequent layer 12, 13 and 14, the filters of that layer act on the feature maps generated from the previous layer. These filter maps are comprised of data, the amount of which may exceed a local memory capacity of a processor processing the neural network, meaning that at each layer 12, 13 and 14 the data that makes up the feature map from the previous layer may need to be read from an external memory. For some smaller layers it may be possible to process the layer using local memory of the processor without making use of the external memory, however filters for the layer will likely need to be fetched from external memory. Once the filters of the current layer have been applied, the data making up the feature map generated by that layer is then written to the external memory in turn, if the layer is too large to be stored using local memory. Depending on the size of the feature map generated, the read and write operations associated with each layer will take a certain amount of time. Typically, for large layers, data will be streamed—that is, the data will be fetched, processed, and potentially written out, continuously.

Depending on the type of neural network and the way that the processor processes the neural network, neural network may have convolutional neural network layers, fully connected layers, recurrent neural network layers, fused layers etc. Similarly, kernel size and depth, stride, and activation function will affect the amount of processing required. Furthermore, the processor may support various optimizations, for example sparsity optimization, that may impact the amount of processing performed by the NPU.

Figure 2:
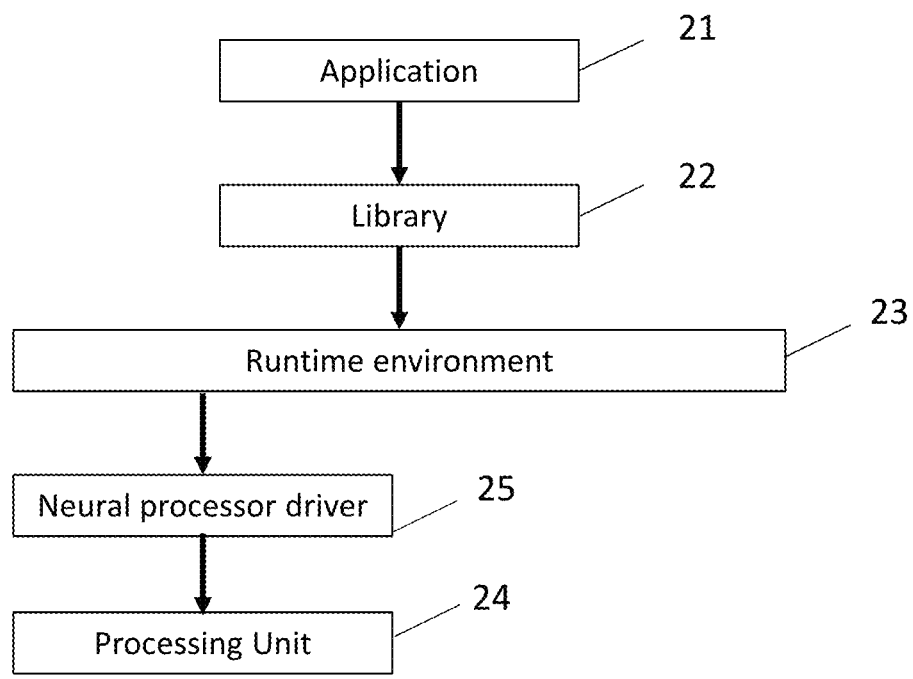
FIG. 2 is a block diagram showing a software architecture of a mobile device.

FIG. 2 shows how a neural network 10 may be deployed in a mobile device application 21 on a mobile device. An application 21 includes a library 22 which it may access, when the application is being executed, to make requests to a neural network runtime environment 23. The neural network runtime environment 23 is configured to manage hardware accelerated processing of calculations required by the convolutional neural network in the application 21. The neural network runtime environment 23 may allocate processing tasks to a dedicated neural processing unit 24, which enables hardware acceleration. A neural processor driver 25 is provided to translate requests from the neural network runtime environment 23 to the neural processing unit 24 and to perform other operations. In this way, a neural network 10 included in the application 21 can have appropriate calculations relating to the convolutional neural network hardware accelerated by processing on the neural processing unit 24.

Figure 3:
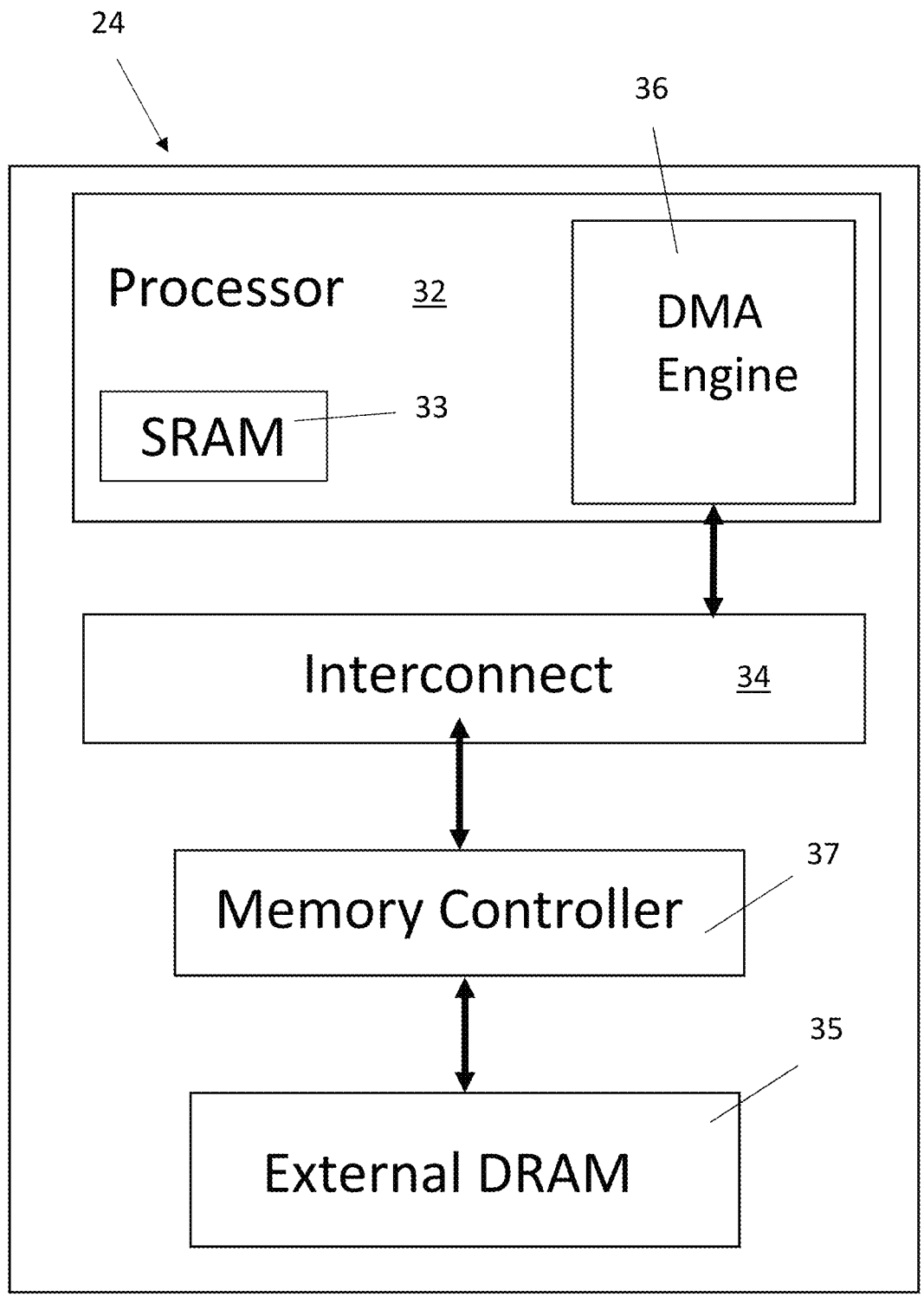
FIG. 3 is a schematic diagram showing components of a processing unit.

FIG. 3 shows more detail of the neural processing unit 24. The processing unit includes a processor 32, a data link in the form of an interconnect 34, and an external memory 35. The processor 32 comprises DMA (Direct Memory Access) engine 36 which sends transaction requests to a memory controller 37 that controls access to the external memory 35. The processor 32 contains a local memory in the form of internal memory 33 but may, in use, generate data that exceeds the local memory capacity. The processor 32 is connected to the external memory 35, across the interconnect 34. The interconnect 34 facilitates transmission of data between processor 32 and external memory element 35. The DMA engine 36 performs memory access operations, able to generate memory addresses and initiate read or write cycles from and to the external memory 35 via the memory controller 37. Processor 32 grants DMA engine 36 access to interconnect 34, allowing DMA engine 36 to initiate the memory operation while processor 32 performs other operations. Inclusion of DMA 36 in system 31 therefore allows transfer of data between processor 32 and external memory 25 with a lower processor overhead than a system without a DMA channel.

In one embodiment, interconnect 34 is an AXI interconnect configured to use an AXI interface. The AXI interface contains five separate transmission channels, to facilitate communication between processor 32 and external memory 35. There is a channel each for Read Address, Write Address, Read Data, Write Data, and Write Response. The transmission of control signal and address is performed in a different phase to the transmission of data—the address must therefore be transferred between the connected devices prior to the corresponding data transfer taking place. The Write Response channel is used to indicate successful writing of data from the processor 32 to the external memory 35.

Figure 4:
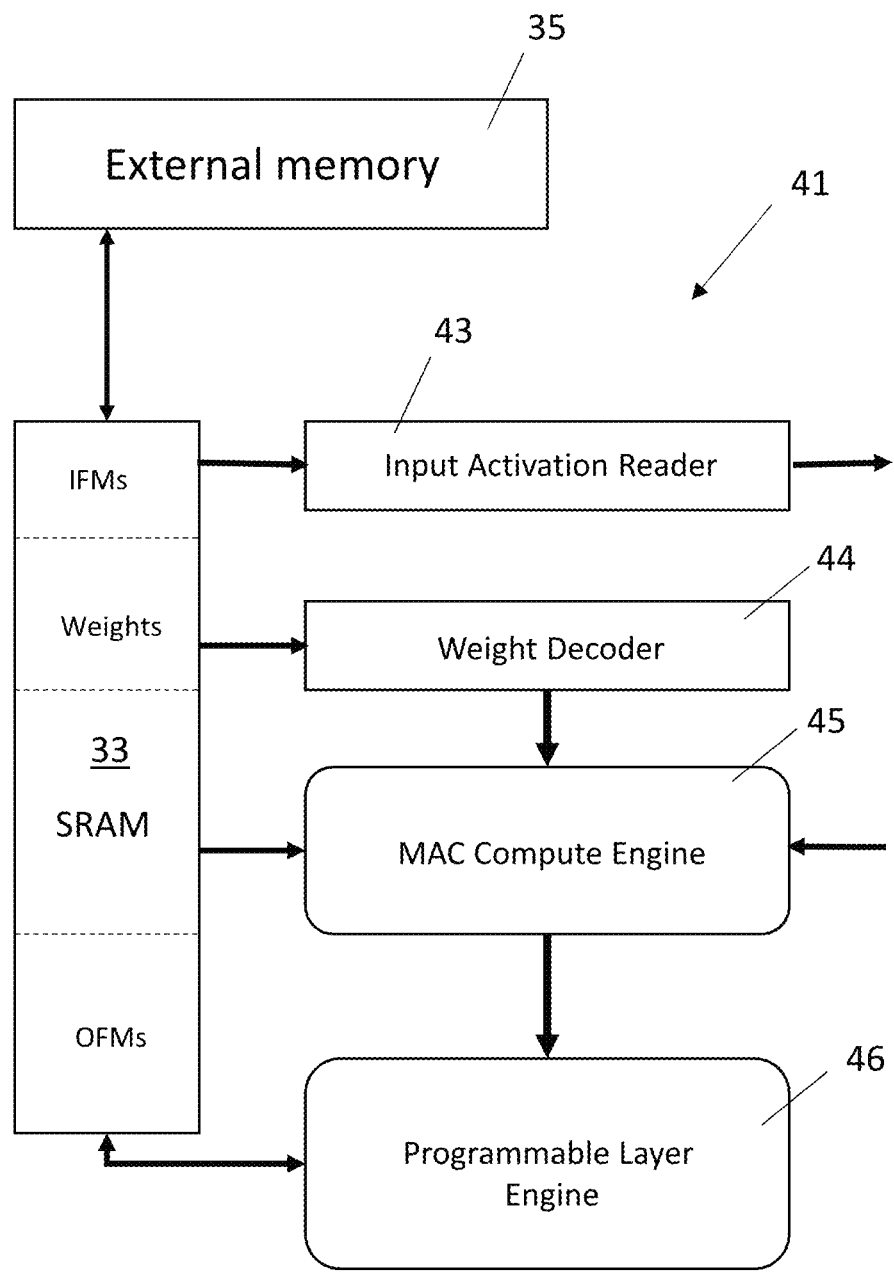
FIG. 4 is a schematic diagram showing components of a processor.

FIG. 4 shows an overview of a compute engine 41 of a type that would be found in a Neural Processing Unit (NPU) architecture, such as processor 32. The NPU will contain multiple compute engines, connected by a broadcast network (not shown). The compute engine 41 is configured to access the previously described local memory 33, such as SRAM, by means of a second DMA (not shown). When a neural network processed by the compute engine 41 is compiled—that is, mapped to a command stream—the local memory (SRAM) 33 is partitioned into sections as shown.

These sections include Input Feature Maps (IFMs), Output Feature Maps (OFMs) and model weights for the neural network.

Upon execution, input activation reader 43 reads a patch of the input feature map from local memory 33. The weights for a given layer are retrieved from local memory 33 and decompressed by a weight decoder 44. The decompressed weights are passed to the Multiplier-Accumulator (MAC) Compute Engine (MCE) 45. MCE 45 also receives the input activations.

MCE 45 performs matrix multiply operations on the received data. These operations make up the filters described above in relation to FIG. 1. The result of these operations is then passed to Programmable Layer Engine (PLE) 46. PLE 46 further refines and enhances the output of MCE 45, for example by performing pooling, activation function, or other such operations. The programmable nature of PLE 46 allows a wide variety of operations to be implemented, meaning that the PLE 46 is not tied to a single operation, but allows new techniques to be added to the neural processing unit 24 containing compute engine 41 on a continuous basis.

Once PLE 46 has enhanced and refined the output of MCE 45, the resulting OFM is transferred to local memory element 33 and then to the external memory 35 if required. The transfer to external memory 35 is carried out via the DMA channel discussed in relation to FIG. 3. For some operations on certain data, PLE 46 may retrieve the data directly from local memory 33.

The output feature map data may have multiple dimensions. For the purposes of the following explanation the output feature map data will be assumed to have four dimensions, but other implementations may vary the number of dimensions.

The input layer 11 shown in FIG. 1 accepts a tensor with a shape (number of images)×(image height)×(image width)×(image depth). After passing through a convolutional layer, the image becomes abstracted to a feature map with shape (batch number)×(feature map height)×(feature map width)×(feature map channels). In the following description, the terminology NHWC is adopted to represent these dimensions, where N is the batch number, H is the height, W is the width and C is the channel. It will be assumed that a single image is being dealt with such that there is a single batch, which will always take a value of 1. The layout NHWC for example, means that the elements of the feature map are stored in an order which iterates first over the C dimension, then iterates over W, and then finally H. The DMA and other hardware units assume NHWC layout (or format) when operating on local memory 33.

A common layout for tensors stored in memory is to store each element contiguously in a linearly addressable memory (DRAM), progressing through the tensor along each dimension in turn. When retrieving or writing to the external memory 35 the DMA engine 36 is configured to read or write in one of two standard formats 'NHWC' and 'NCHW'. Note that the DMA is not conventionally configured to perform any kind of permutation, but that two data formats are supported in terms of reading from and writing to appropriate address memories.

In the course of processing some neural networks, such as some super-resolution neural networks, it may become necessary to permute the dimensions of the output feature map, often at the end of processing a layer. If the tensor is stored in the common layout described above (NHWC), the process of permuting the tensor involves moving the position of the tensor values within the memory, without performing any computation on the tensor values.

The PLE 46 described above is programmable to perform a transpose operation. However, the PLE 46 only has limited capacity to operate on tensor values. For example, it may be limited to operating on a maximum of 16×16 tensor values at a time. The PLE 46 can be programmed to perform a transpose of 16×16 tensor values by multiplying by a suitable matrix, which is known as use of a swizzle. Further, the PLE 46 is limited in that it can only operate on a slice of data from one channel at a time because channels are parallelized across multiple compute engines 41. Accordingly, the PLE 46 cannot be used to perform a permutation in a case where the channel dimension needs to be permuted.

FIG. 5 shows steps for permuting dimensions of a four-dimensional tensor NHWC in five possible combinations. There are 6 possible combinations of the three dimensions HWC. As one combination is the trivial example of no permutation of the dimensions, the five combinations are all possible permutations of the three dimensions. It is recalled that the batch number takes a value of 1 and does not need to be permuted. These possible permutations are labelled in FIG. 5 as permutations from an initial order of dimensions 0123. Accordingly, a permutation 0213 is a permutation that swaps H and W. In other words, batch, N, is equated with 0, height, H, is equated with 1, width, W, is equated with 2 and channel, C, is equated with 3

FIG. 6a shows a tensor stored in external memory 35 and FIG. 6b shows the tensor after a 0231 permutation of the dimensions. The tensor stored as illustrated in FIG. 6a is show with four channels, labelled A, B, C, D. These channels are repeated horizontally across the figure to give a width dimension W and extend down the figure in a H dimension as illustrated on the Figure. The initial dimensions NHWC are 1×8×3×4.

A first step in the permutation is to read the tensor from the external memory 35 as if it were stored in NCHW format. This is performed by the processor 24 controlling the DMA engine 36 to read in that format. As the data is actually stored in NHWC format the H dimension is mapped to the C dimension, the W dimension is mapped to the H dimension and the C dimension is mapped to the W dimension. This gives the desired 0231 dimension permutation. Following the transfer of the tensor values, the data has been read from the external memory 35 to the local memory 33. Accordingly, in order to return the data to the external memory 35 the data may be stored by the DMA engine 36 using its normal NHWC mode and subsequently read from the external memory 35 when required using the normal NHWC mode. Reading and writing from the external memory 35 in this way using the same mode won't permute the dimensions of the tensor which is now in the desired NWCH (0231) format.

FIG. 6b shows the NWCH data following the permutation of the dimensions. The resulting data has a size of 1×3×4×8 where the 8 "channels" are denoted by the values A, B, C, D, E, F, G, H. Note that the data is 4×8 values long in the horizontal direction, but the data is shown split into two parts in FIG. 6b in order to make the presentation clearer.

FIG. 7a again shows a tensor stored in the external memory 35 prior to permutation of the dimensions. FIG. 7b shows the data after a 0213 permutation of the dimensions. As shown in FIG. 5 the data is first loaded from the external memory 35 by the DMA engine 36 in NHWC format. As the data was originally stored in NHWC format, this does not permute the dimensions of the tensor. Next the data is processed by the PLE 46 in order to swap the H and W dimensions. Processing by the PLE 46 gives the desired 0213 permutation. The tensor following this permutation of dimensions is shown in FIG. 7b. The data has been read from the external memory 35 to the local memory 33. Accordingly, in order to return the data to the external memory 35 the data may be stored by the DMA engine 36 using its normal NHWC mode and subsequently read from the external memory 35 using the normal NHWC mode when required. Reading and writing from the external memory 35 in this way using the same mode won't permute the dimensions of the tensor which is now in the desired NWHC (0213) format.

FIG. 7b shows the NWHC data following the permutation of the dimensions. The resulting data has a size of 1×3×8×4. As the data is 8×4 values long in the horizontal direction, the data is shown split into two parts in FIG. 7b in order to make the presentation clearer. The difference between the tensor shown in FIG. 7b and the tensor shown in FIG. 6b can be seen in that FIG. 6b shows a tensor with 8 channels A to H, whereas the tensor shown in FIG. 7b has 4 channels.

Figure 8C:

FIGS. 8a to 8c illustrate the 0321 dimension permutation. As before, FIG. 8a shows the tensor 0123 in the external memory 35. As described in connection with FIGS. 6a and 6b, the data is read out by the DMA engine 36 based on instructions from the processor 24 as if it were stored in NCHW format. This has the effect of permuting the dimensions to 0231 as previously described. The tensor shown in FIG. 8b is then subject to permutation of the H and W dimensions by the PLE 46. This converts the data to 0321 or NCWH as shown in FIG. 8c. The data is in the local memory 33 and can be written back to the external memory 35 and read back from the external memory 35, as needed, using the normal NHWC format, which as previously described does not permute the dimensions of the tensor.

FIGS. 9a and 9b illustrate the 0312 permutation of dimensions of the tensor. Initially the tensor shown in FIG. 9a is loaded from the external memory 35 to the local memory 33. This step is performed using NHWC format, which is the same format that the tensor is initially stored in. Accordingly, there is no permutation of the dimensions as the data is read from the external memory 35. The NHWC data in the local memory 33, shown in FIG. 9b, is then written back to the external memory 35 as if it were NCHW data. This writing operation maps the C dimension to the H dimension, the H dimension to the W dimension and the W dimension to the C dimension, resulting in 0312 as shown in FIG. 9b. As before, the tensor is split across two horizontal rows in the figures for convenience of presentation only. The tensor can subsequently be read from the external memory 35 in NHWC format with the desired permutation of dimensions having been performed.

FIGS. 10a to 10d illustrate a method for performing a 0132 permutation of the dimensions of the tensor. As before, in FIG. 10a, the original tensor is shown in the external memory 35. The tensor is stored in NHWC format but is read from the external memory 35 in NCHW format, which permutes the dimension of the tensor to 0231 as previously described in connection with FIGS. 6a and 6b. This tensor in the local memory 33 shown in FIG. 10b. The tensor in 10b is then subjected to H, W dimension permutation by the PLE 46. This results in a tensor in 0321 format as shown in FIG. 10c. The tensor shown in FIG. 10c is then written back to the external memory 35 as if it were stored in NCHW format, which results in the data being stored in 0132 as shown in FIG. 10d. The data may subsequently be retrieved from the external memory 35 as if it is in the normal NHWC format and the desired permutation of dimensions will have been performed.

Figure 11:
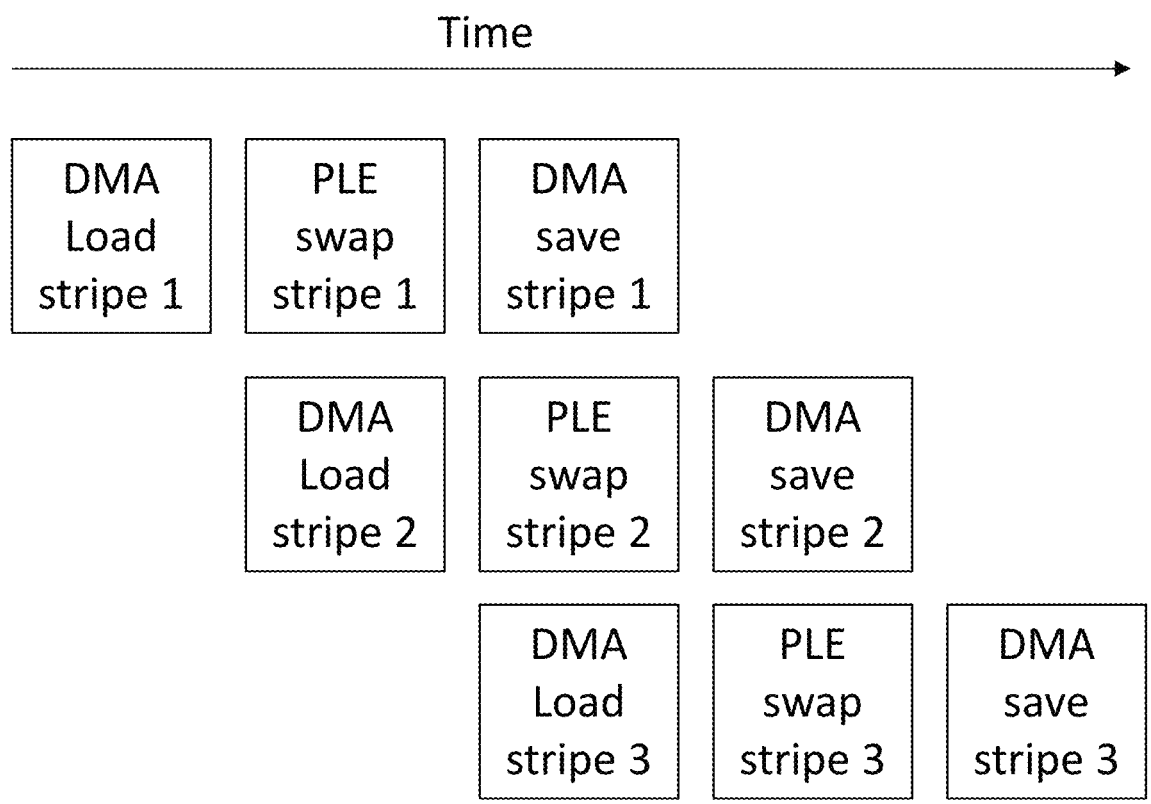
FIG. 11 illustrates pipelining steps for permuting dimensions of a tensor.

The methods described above for permuting dimensions of a tensor may be pipelined as follows. The tensor values may be read from the external memory 35 in stripes. FIG. 11 shows pipelining of the steps of loading a stripe from the external memory 35 to the local memory 33, a swap operation by the PLE 46, and a write operation from the local memory 33 to external memory 35. Permutations 0132, 0213, and 0321 described above all involve these three operations. As shown in FIG. 11, a first stripe of tensor values is read from external memory 35 and written to local memory 33 in the appropriate format as previously described, a PLE operation is then be performed on the first stripe of tensor values. In parallel with the PLE operation on the first stripe of tensor values, a second stripe of tensor values is read from the external memory 35 to the local memory 33. In a following time period, three operations may take place in parallel: the first stripe of data may be written back from the local memory 33 to the external memory 35, the second stripe of tensor values may be subject to a swapping operation by the PLE 46, and a third stripe of tensor values may be read from the external memory 35 to the local memory 33. In the next time period, the second stripe of tensor values may be saved from the local memory 33 to the external memory 35 while the third stripe of tensor values is subject to a swapping operation by the PLE 46. Finally, the third stripe of tensor values is written back from the local memory 33 to the external memory 35.

The above example illustrates the process with three stripes of tensor values, but of course any suitable number of stripes of tensor values may be used. Further, for methods of permuting dimensions of a tensor described above that do not require a swapping operation by the PLE 46, the method may be trivially adapted to pipeline the two steps of reading the tensor values from the external memory 35 to the local memory 33 and writing the tensor values back from the local memory 33 to the external memory 35.

The pipelining described above may find application where the storage capacity of the local memory 33 is limited and a large tensor needs processing. The pipelining means that the methods described above can be applied to smaller 'sub-tensors' and the result built up incrementally in external memory 35.

As noted earlier, the PLE 46 may only be able to access a limited number of tensor values at a time. In this embodiment, the PLE 46 is limited to 16×16 tensor values. However, the neural processing unit 24 may have multiple compute engines, with each compute engine having a PLE 46. According to one embodiment, the neural processing unit 24 has sixteen compute engines. In this and other embodiments, the swapping operation performed by the PLE 46 of swapping the H and W dimensions is parallelized across the computer engines for faster processing. The processed 16×16 blocks are stored in the local memory 33 by the second DMA in a transposed arrangement such that the overall permutation of dimensions of the tensor is achieved.

Embodiments above describe processing on a neural processing unit 24, but the techniques described above are applicable to processors more generally. The method may be used with any processor, such as a graphics processor unit or central processor unit. The techniques may find greater useful application where the processor is constrained and does not already have a dedicated function for permuting dimensions of a tensor.

The methods described above include reading from the external memory 35 to the local memory 33 and writing back from the local memory 33 to the external memory 35. However, for permutations described above that do not permute the dimensions when transferring tensor values from the local memory 33 to the external memory 35, such as the 0213 permutation, the step of writing back from the local memory 33 to the external memory 35 may be unnecessary and the data may be subsequently processed directly from the local memory 33 in some implementations.

An alternative to the methods of permuting a tensor described above would be to use a general-purpose CPU which can access any part of the tensor at any time and so very simply move elements into the required places. However, this would be less efficient, even on a multi-core CPU. Accordingly, offloading this computation to the NPU or another specialized processor allows the CPU to focus on other tasks for which it is more suited.

The above methods may be implemented in software instructions provided in a memory of the processor 24. The software instructions may be stored in a storage of the processor. The methods may also be implemented in hardware such that the processor is configured to perform the methods described above.

What is claimed is:

1. A method performed by a processor comprising a plurality of compute engines each of which comprises a programmable engine and a multiply-accumulate engine, each programmable engine operating up to a maximum number of tensor values in a cycle, each programmable engine configured to operate on a slice of data including data from one channel of a multi-dimensional tensor at a time such that channels of the multi-dimensional tensor are parallelized across multiple compute engines, wherein each multiply-accumulate engine is configured to perform matrix multiply operations on received data to generate output data, and a respective programmable engine is configured to receive the output data from the multiply-accumulate engine in order to perform a permutation function on the output data, wherein the method-permutes dimensions of the multi-dimensional tensor, which contains an array of tensor values in three or more dimensions that are stored in a first storage unit, the method comprising:

transferring the array of tensor values from the first storage unit to a second storage unit by reading tensor values from the first storage unit that are arrayed along a first dimension of the multi-dimensional tensor and writing the corresponding tensor values to the second storage unit in locations corresponding to a second dimension of the multi-dimensional tensor that is different from the first dimension thereby reordering the tensor values; and a plurality of programmable engines of the plurality of compute engines permuting a pair of dimensions of the multi-dimensional tensor in parallel by sequentially:

reading sub-blocks of the multi-dimensional tensor from a local storage, permuting the pair of dimensions of the sub-blocks of the multi-dimensional tensor and writing the permuted sub-blocks to the local storage of the processor, wherein the sub-blocks are read from and written to the local storage using addresses in the local storage so as to re-order the sub-blocks to complete the permutation of the pair of dimensions across the multi-dimensional tensor, wherein the local storage is one of the first storage unit and the second storage unit.

2. A method according to claim 1, wherein the first storage unit is one of an external storage unit in communication the processor and the local storage unit of the processor and the second storage unit is the other of the external storage unit in communication with the processor and the local storage of the processor.

3. A method according to claim 1, wherein the processor is at least one of a neural processing unit, a graphics processing unit, and a central processing unit.

4. A method according to claim 1, wherein the multi-dimensional tensor is an output feature map of a neural network.

5. A method according to claim 1, wherein tensor values are read from the first storage unit and written to the second storage unit in stripes of data.

6. A method according to claim 5, wherein the method comprises transferring the array of tensor values from the second storage unit to the first storage unit, wherein transferring the stripe of tensor values from the first storage unit to the second storage unit occurs in parallel with transferring another stripe of tensor values from the second storage unit to the first storage unit.

7. A method according to claim 6, wherein the plurality of programmable engines permute a pair of dimensions of a further stripe of the multi-dimensional tensor in parallel with at least one of transferring the stripe of tensor values from the first storage unit to the second storage unit and transferring another stripe of tensor values from the second storage unit to the first storage unit.

8. A processor comprising a plurality of compute engines each of which comprises a programmable engine and a multiply-accumulate engine, each programmable engine operating up to a maximum number of tensor values in a cycle, each programmable engine configured to operate on a slice of data including data from one channel of a multi-dimensional tensor at a time such that channels of the multi-dimensional tensor are parallelized across multiple compute engines, wherein each multiply-accumulate engine is configured to perform matrix multiply operations on received data to generate output data, and a respective programmable engine is configured to receive the output data from the multiply-accumulate engine in order to perform a permutation function on the output data, and the processor is configured to permute dimensions of a multi-dimensional tensor which contains an array of tensor values in three or more dimensions that are stored in a first storage unit, the processor comprising:

a controller configured to control transfer of the array of tensor values from the first storage unit to a second storage unit by reading tensor values from the first storage unit that are arrayed along a first dimension of the multi-dimensional tensor and writing the corresponding tensor values to the second storage unit in locations corresponding to a second dimension of the multi-dimensional tensor that is different from the first dimension thereby reordering the tensor values;

wherein a plurality of programmable engines of the plurality of compute engines are configured to permute a pair of dimensions of the multi-dimensional tensor in parallel by sequentially:

reading sub-blocks of the multi-dimensional tensor from a local storage, permuting the pair of dimensions of the sub-blocks of the multi-dimensional tensor and writing the permuted sub-blocks to the local storage of the processor, wherein the sub-blocks are read from and written to the local storage using addresses in the local storage so as to re-order the sub-blocks to complete the permutation of the pair of dimensions across the multi-dimensional tensor, wherein the local storage is one of the first storage unit and the second storage unit.

9. A non-transitory computer-readable storage medium storing instructions that, when performed by a processor according to claim 8, cause the processor to perform a method for permuting dimensions of a multi-dimensional tensor, wherein the multi-dimensional tensor contains an array of tensor values in three or more dimensions that are stored in a first storage unit, the method comprising:

transferring the array of tensor values from the first storage unit to a second storage unit by reading tensor values from the first storage unit that are arrayed along a first dimension of the multi-dimensional tensor and writing the corresponding tensor values to the second storage unit in locations corresponding to a second dimension of the multi-dimensional tensor that is different from the first dimension thereby reordering the tensor values; and a plurality of programmable engines permuting a pair of dimensions of the multi-dimensional tensor in parallel by sequentially:

reading sub-blocks of the multi-dimensional tensor from a local storage, permuting the pair of dimensions of the sub-blocks of the multi-dimensional tensor and writing the permuted sub-blocks to the local storage of the processor, wherein the sub-blocks are read from and written to the local storage using addresses in the local storage so as to re-order the sub-blocks to complete the permutation of the pair of dimensions across the multi-dimensional tensor, wherein the local storage is one of the first storage unit and the second storage unit.

* * * * *